United States Patent

[11] 3,593,578

| [72] | Inventors | Thomas C. Farrell<br>Glenshaw;<br>Harry W. Fisher, Pittsburgh, both of, Pa. |
|---|---|---|
| [21] | Appl. No. | 727,797 |
| [22] | Filed | May 9, 1968 |
| [45] | Patented | July 20, 1971 |
| [73] | Assignee | Emerson Electric Co.<br>Saint Louis, Mo. |

[54] HEAT TRANSFER METERS
14 Claims, 11 Drawing Figs.

[52] U.S. Cl. .................................................. 73/190,
 73/193
[51] Int. Cl. ..................................................... G01n 1/00
[50] Field of Search .......................................... 73/190, 193

[56] References Cited
UNITED STATES PATENTS
606,749  7/1898  Uehling.......................  73/193

2,109,757  3/1938  Stephens....................  73/193

*Primary Examiner*—Richard C. Queisser
*Assistant Examiner*—John K. Lunsford
*Attorney*—Strauch, Nolan, Neale, Nies and Kurz ABSTRACT: An apparatus for measuring the amount of heat absorbed or given up by a heat-transferring structure such as a heat exchanger and comprising a wheel-and-disc-type integrator having a disc coupled to a volumetric flowmeter output shaft and a wheel positionable on the disc by a dual bellows assembly which measures the inlet and outlet temperatures of the heat exchanger. The position of the wheel represents the differential between the foregoing temperatures, and the integrator multiples the volume of fluid flowing through the heat exchanger by the temperature differential. A differential mechanism, having inputs respectively coupled to the output of the integrator and to the output of the flowmeter, has an output drive connected to a counter for totalizing the amount of heat transferred relative to the heat exchanger.

INVENTORS
THOMAS C. FARRELL
HARRY W. FISHER

BY Strauch, Nolan, Neale, Nies & Kurz
ATTORNEYS

INVENTORS
THOMAS C. FARRELL
HARRY W. FISHER

INVENTORS
THOMAS C. FARRELL
HARRY W. FISHER

BY Strauch, Nolan, Neale,
Nies & Kurz
ATTORNEYS

INVENTORS
THOMAS C. FARRELL
HARRY W. FISHER
BY Strauch, Nolan, Neale,
Nies & Kurz
ATTORNEYS 3,593,578

1

HEAT TRANSFER METERS

FIELD OF INVENTION

This invention relates to heat transfer or thermal meters for measuring the amount of heat transferred relative to a heat-using organization such as a heat exchanger.

BACKGROUND

Prior to this invention, wheel- and disc-type integrators have been used in heat transfer meters for multiplying the volume of fluid flowing through a heat exchanger by the temperature differential across the inlet and outlet ends of the heat exchanger to provide a measure of the amount of heat transferred. These meters usually include bourdon tubes which are connected to temperature-sensing elements at the heat exchanger and which impart movement through a linkage to control the position of the integrator wheel in accordance with the differential between the sensed temperatures. Bourdon tubes, however, are disadvantageous in that they have comparatively little motive force for moving the integrator wheel along the disc and in that their response to sensed temperature changes is not accurately linear particularly over a relatively wide range of temperature variations.

Bellows of the axially expansible and contractable type have greater power and are more linear as compared with bourdon tubes, but heretofore, no satisfactory thermal meter has been proposed incorporating bellows with convenient adjustments and a simplified, compact arrangement for connecting the bellows to the integrator wheel and for supporting the bellows with the other parts of the meter.

SUMMARY OF INVENTION, OBJECTS AND DESCRIPTION OF DRAWINGS

According to this invention, a pair of axially expansible- and contractable-type temperature response bellows are employed to determine the temperature differential and are connected by a unique linkage arrangement to the integrator wheel to improve the accuracy of heat transfer measurements. This linkage incorporates a convenient and simplified adjustment for each bellows to compensate for variations in bellows travel. These variations are attributable to normal manufacturing tolerances.

Separate calibrating adjustments are provided to compensate for variations in the lengths of the two bellows to ensure that the integrator wheel is at its zero position when sensed temperatures are equal.

The motion-transmitting linkage connecting the bellows to the integrator wheel in the meter of this invention is simplified particularly by virtue of having only a single spring which biases the bellows and the linkage components to take up lost motion. The spring is so arranged and the linkage is so constructed that when one bellows contracts by an axial distance equal to the axial expansion of the other bellows or when one bellows expands by an axial distance equal to the axial contraction of the other bellows the biasing force exerted by the spring remains substantially constant.

By virtue of the novel linkage arrangement mentioned above, the thermally responsive bellows are adapted to be mounted in close, side-by-side, parallel relation to provide a compact arrangement. The bellows are furthermore supported above the other operative components of the meter where they are readily accessible for adjustment or replacement upon removal of a cover.

In addition to the foregoing, the novel motion-transmitting linkage of this invention affords an arrangement whereby an indicator is connected to provide for a readout of the temperature differential in addition to the registration of the amount of heat transferred.

Accordingly, a major object of this invention is to provide a novel heat transfer or thermal meter for measuring the amount of heat transferred relative to a heat exchanger or other form of heat-using organization.

2

A more specific object of this invention is to provide a novel heat transfer meter which more accurately measures the amount of heat transferred as compared with prior meters.

Still another more specific object of this invention is to provide a novel, compact, simplified heat transfer meter incorporating a wheel- and disc-type integrator and a thermally responsive, dual-bellows assembly.

A further object of this invention is to provide a novel motion-transmitting linkage arrangement for connecting the thermally responsive dual-bellows assembly to the integrator wheel in the meter.

Still another object of this invention is to provide a novel set of calibrating adjustments to compensate for variations in bellows travel and for variations in the lengths of the bellows in the dual assembly.

Another object of this invention is to provide the wheel-supporting output shaft of the wheel- and disc-type integrator with a novel support assembly whereby the bearings journaling the shaft are allowed to float against the bias of a spring toward and away from the wheel-engaging disc surface to compensate for irregularities in the disc surface and thus reduce friction and binding between the integrator wheel and the disc.

Still another object of this invention is to provide a novel heat transfer meter wherein a motion-transmitting gear train which is drive connected to the totalizing counter is readily accessible to facilitate a change in gear ratios.

Further objects of this invention will appear as the description proceeds in connection with the appended claims and annexed drawings wherein:

Figure 1:
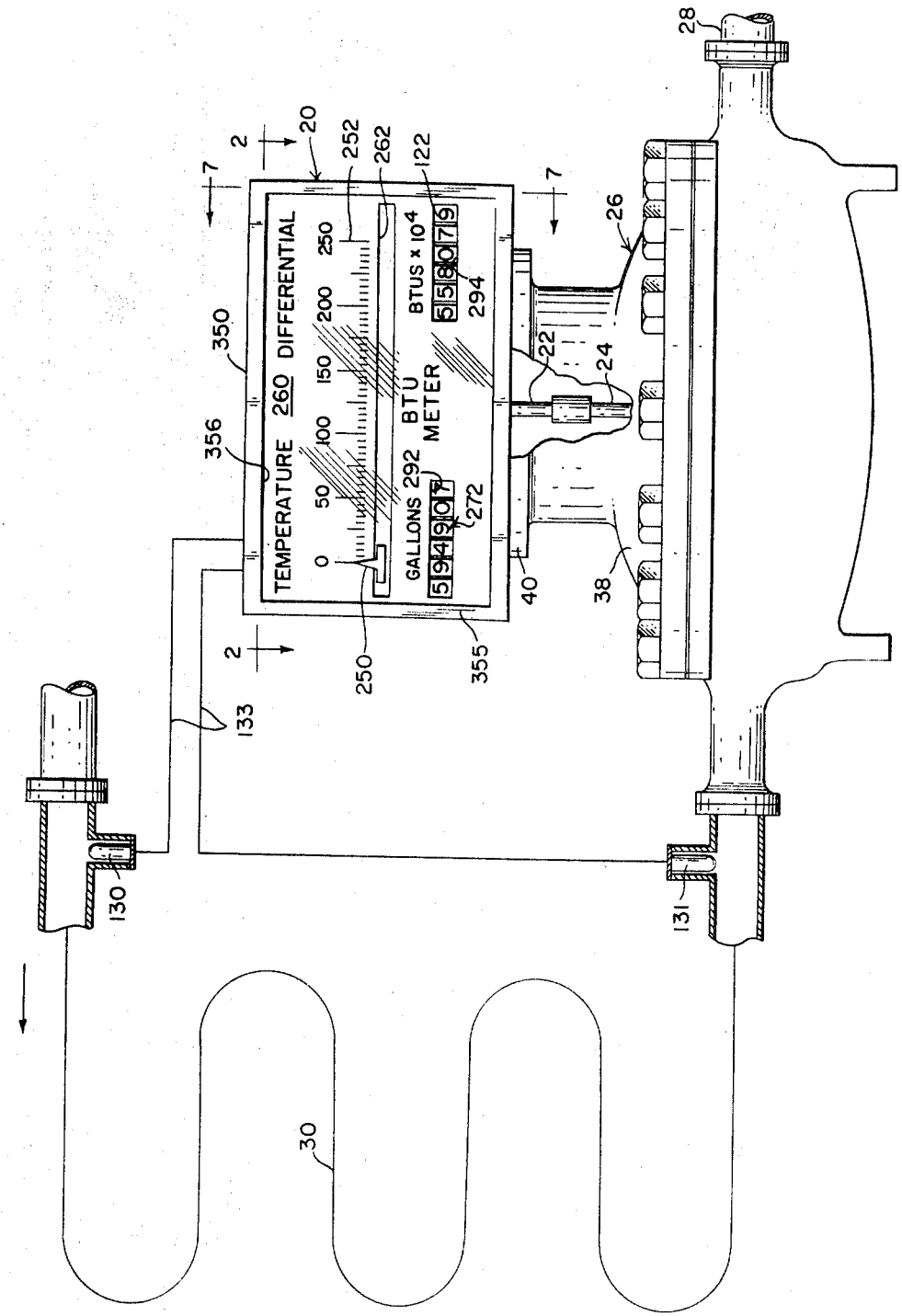
FIG. 1 is a partially schematic front elevation illustrating the heat transfer meter of this invention connected to a heat exchanger.

Referring now to the drawings and more particularly to FIG. 1, the thermal meter of this invention comprises a temperature-responsive computing unit 20 having an input shaft 22 nonrotatably coupled to an output shaft 24 of a fluid meter 26. Meter 26 may be of any suitable, conventional construction and preferably is of the positive displacement or current type. One such suitable meter is described in U.S. Pat. No. 2,410,852 issued to A. R. Whittaker on Nov. 12, 1946 for Fluid Meter.

In this embodiment, meter 26 is connected in a pipeline 28 which is connected to a heat exchanger 30. Line 28 may be either the inlet or outlet for heat exchanger 30, whichever is suitable for a given application.

Heat exchanger 30 may, by way of example, be part of a heat absorption or cooling system such as a chilled water refrigeration system, or it may be part of a heating system such as a hot water heating system. In either case, the amount of heat given up or absorbed by heat exchanger 30 is provided by the following equation:

$$BTU = mCp\Delta T = \Phi V Cp\Delta T$$

where:

BTU = amount of heat given up or absorbed.

$m$ = mass flow.

$Cp$ = specific heat at constant pressure.

$\Delta T$ = differential temperature between inlet and outlet of the heat exchanger.

$\Phi$ = density of fluid being metered.

$v$ = volumetric flow.

The number of revolutions per unit time made by shafts 22 and 24 is proportional to the volumetric flow rate. A temperature-responsive, dual-bellows and sensing element assembly 32 (see FIG. 2) forming a part of unit 20 provides an output, as will be explained in greater detail shortly, that is proportional to the differential temperature, $\Delta T$, between the inlet and outlet of exchanger 30. A mechanical integrating device 34 (see FIGS. 3 and 4) also forming a part of unit 20 performs the function of multiplying $V$ by $\Delta T$. Considering the specific heat, $Cp$, and the density, $\Phi$, as being substantially constant, the thermal meter of this invention will therefore provide a registration of the heat transfer in terms of BTUs or other heat measurement units as desired.

As shown in FIG. 1, meter 26 has a casing 38 which is formed with a flange 40 for mounting unit 20. Unit 20 is provided with a mounting flange 41 (see FIG. 3) which is seated on flange 40 and which is detachably secured thereto by any suitable means such as screws indicated at 43. A mounting plate 42 forming a part of unit 20 is secured on flange 41 by screws 43.

Figure 7:
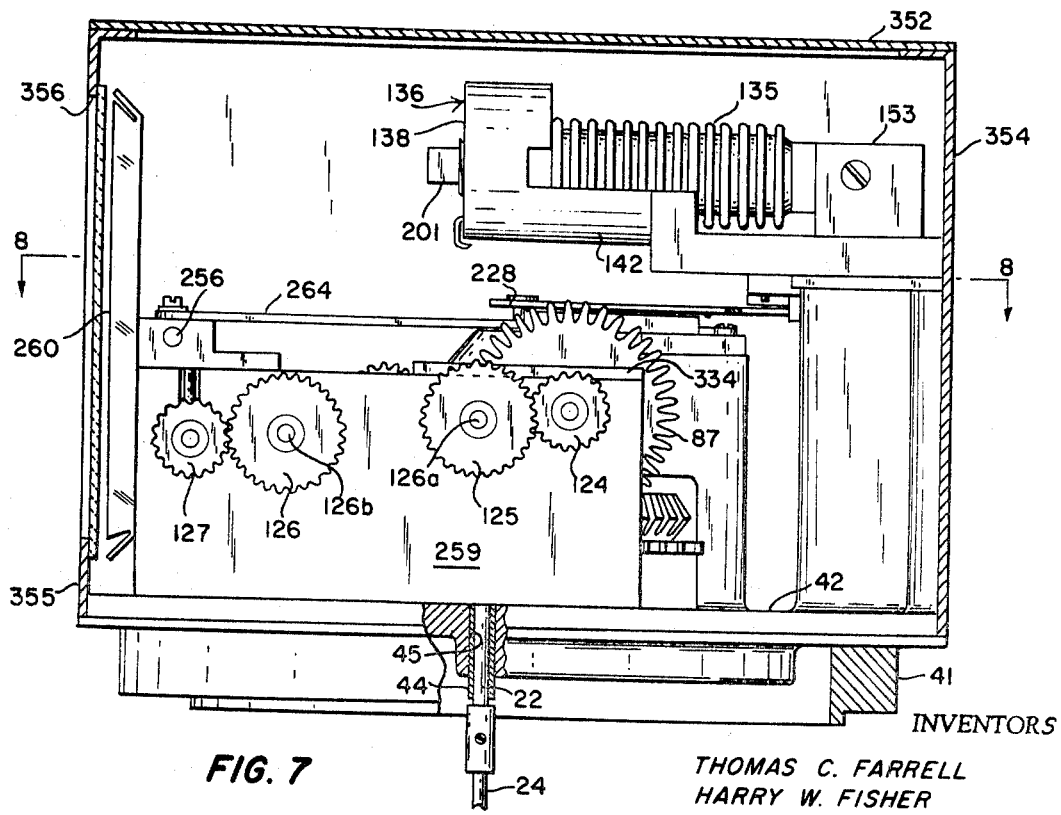
FIG. 7 is a section taken substantially along lines 7-7 of FIG. 1.

As best shown in FIG. 7, shaft 22 extends through plate 42 and is journaled for rotation about an axis aligning with the rotational axis of shaft 24 by a bearing comprising a sleeve bushing 44. Bushing 44 is coaxially received with a press fit in a bore 45 formed through plate 42. An input gear 46 for unit 20 is fixed on the upper end of shaft 22 which extends above plate 42. Gear 46 constantly meshes with a gear 48 which is coaxially and nonrotatably fixed on a shaft 50.

Figure 3:
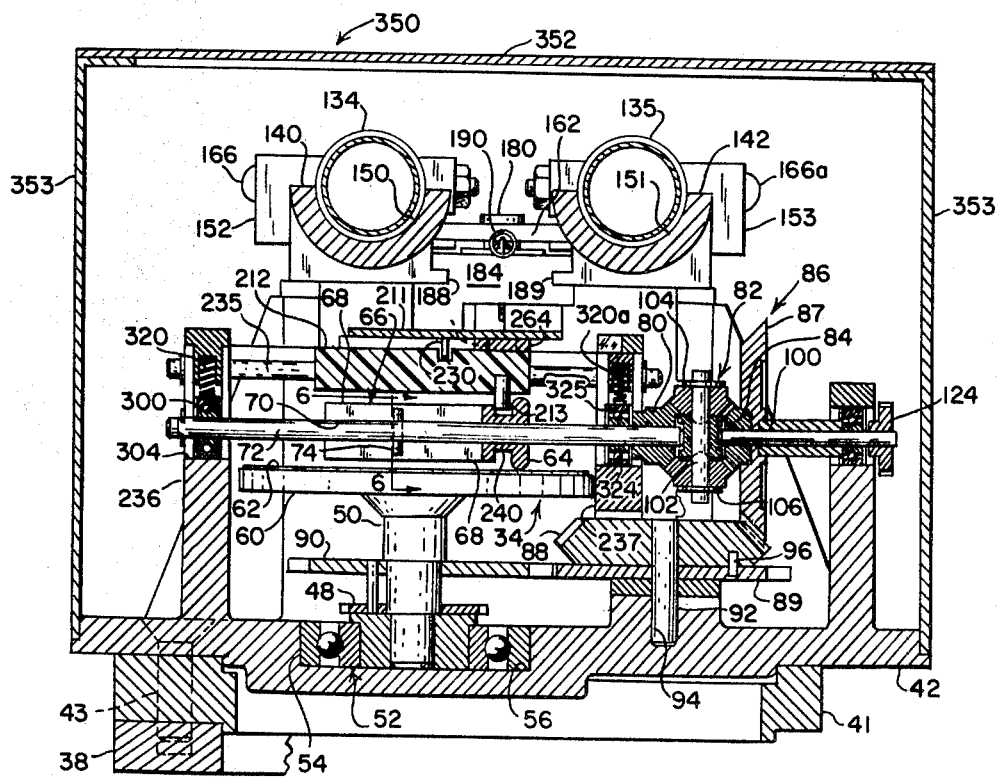
FIG. 3 is a section taken substantially along lines 3-3 of FIG. 2.

Shaft 50, as shown in FIG. 3, is journaled in a suitable, antifriction roller bearing assembly 52. The outer race 54 of bearing assembly 52 is received with a press fit coaxially in a cylindrically walled recess 56 which is formed in plate 42. The rotational axis of shaft 50 is in parallel spaced-apart relation to the rotational axis of shaft 22.

Formed integral with the upper end of shaft 50 extending above plate 42 is a uniformly diametered drive disc 60 (see FIG. 3) which constitutes the input of integrating device 34. Disc 60 is coaxial with shaft 50 and is formed with a flat top surface 62 normally intersecting the rotational axis of shaft 50. A uniformly diametered wheel 64 forming the output of integrating device 34 peripherally engages and rolls on surface 62.

Still referring to FIG. 3, wheel 64 is integrally formed on one end of an elongated, cylindrical member 66 having a uniformly diametered shank portion 68 which is of smaller diameter than wheel 64. Member 66 is coaxially formed with a bore 70 through which a differential drive shaft 72 coaxially extends with a sliding fit.

Figure 6:
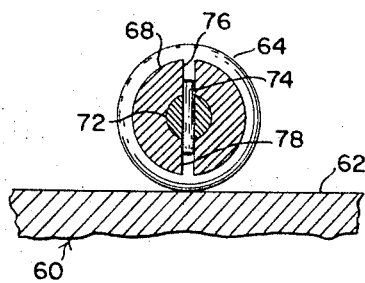
FIG. 6 is a section taken substantially along lines 6-6 of FIG. 3.

As best shown in FIG. 6, member 66 is nonrotatably but axially displaceably mounted on shaft 72 by a pin 74 extending through a transverse bore in shaft 72 and received at opposite ends in diametrically opposed, axially extending, coextensive slots 76 and 78 which are formed in shank portion 68. By engagement with the straight sidewalls of slots 76 and 78, pin 74 prevents rotation of shaft 72 relative to member 66 but allows member 66 to slide axially along shaft 72. Shaft 72 is fixed against axial displacement and is mounted for rotation about an axis substantially normally intersecting the rotational axis of disc 60 in a manner to be described in detail later on.

Figure 4:
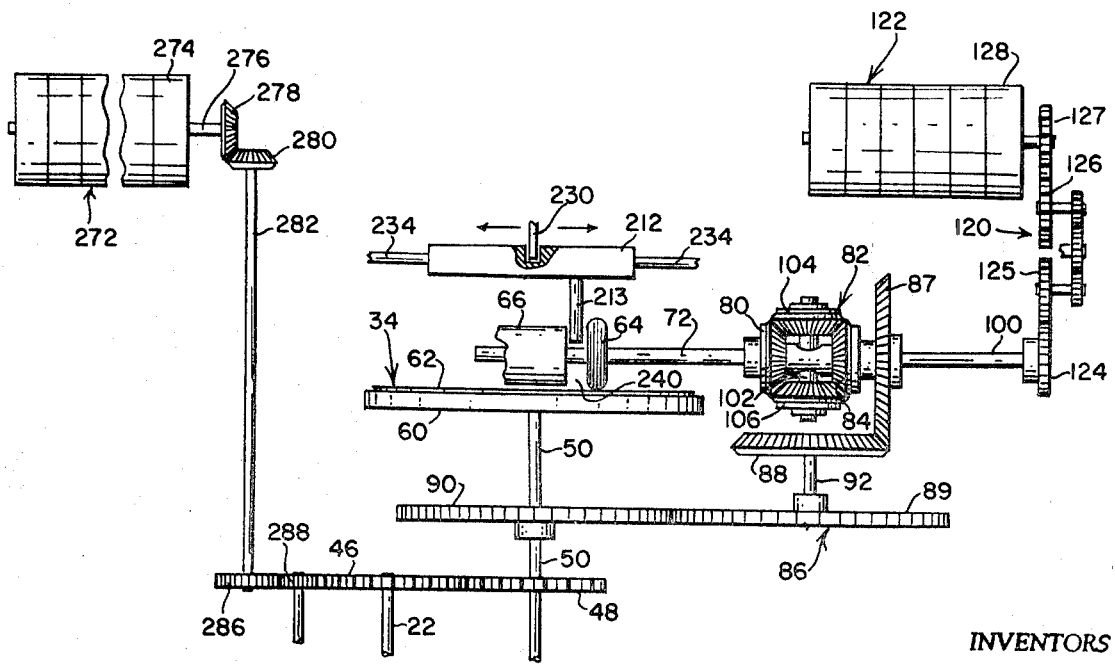
FIG. 4 is a generally schematic view of the computing section of the heat transfer meter shown in FIG. 1.

As shown in FIGS. 3 and 4, a bevel gear 80, which is nonrotatably fixed on the right-hand end of shaft 72 extending radially beyond disc 60, constitutes the input of a conventional differential gear mechanism 82. Gear mechanism 82 has a second input bevel gear 84 which is drive connected to shaft 50 through a gear train 86 comprising gears 87, 88, 89 and 90.

Gear 90 as best shown in FIG. 3, is nonrotatably and coaxially fixed on shaft 50 and constantly meshes with gear 89 which is journaled on a fixed post 92. Post 92 is coaxially fixed in a blind bore 94 along an axis that is parallel with the rotational axis of shaft 50. Bore 94 is formed in mounting plate 42. Gear 88 is journaled for rotation on post 92 above gear 89 and is secured to rotate with gear 89 by any suitable means such as a pin 96. Gears 88 and 89 are suitably confined against axial displacement on post 92. Gears 87 and 88 are of the bevel type and are constantly intermeshed. Gear 87 is fixed to gear 84.

Still referring to FIGS. 3 and 4, gear 87 is coaxially journaled for rotation on an output shaft 100 of differential mechanism 82. Shaft 100 is axially aligned with shaft 72 and is connected at its left-hand end to the differential mechanism spider 102 mounting bevel gears 104 and 106. Gears 104 and 106 constantly mesh with gears 80 and 84 as shown.

All of the gearing in gear train 86 has a 1:1 ratio. More specifically, gears 89 and 90 are in a 1:1 ratio, and gears 87 and 88 are also in a 1:1 ratio. As a result, the number of revolutions made by the differential input gear 84 will be equal to the number of revolutions made by disc 60. However, the number of revolutions made by input gear 80 will depend upon the distance at which wheel 64 is located from the center of disc 60.

The position of wheel 64 on disc 60 is controlled by assembly 32 in response to the temperature differential at the inlet and outlet ends of heat exchanger 30. When there is no difference in the temperature of fluid flowing through the inlet and outlet ends of exchanger 30, wheel 64 will be positioned at a distance from the center of disc 60 which is equal to the radius of wheel 64. For example, if the radius of wheel 64 is one-fourth inch, it will be positioned one-fourth inch from the center of disc 60 when the temperature of the fluid, such as water, at the inlet and outlet ends of heat exchanger 30 is equal.

If, on the other hand, a temperature differential develops at the inlet and outlet ends of exchanger 30, assembly 32 is operative in a manner to be described in greater detail later on to displace member 66 along the axis of shaft 72 to a position disposed radially beyond the location at which wheel 64 is positioned for a zero temperature differential. If, for example, a temperature differential of 50° F. develops across exhanger 30 wheel 64 will be displaced radially of disc 60 to a position where its distance from the center of disc 60 is greater than the radius of the wheel. This distance minus the radius of wheel 64 will be proportional to the temperature differential between the fluid at the inlet and outlet ends of heat exchanger 30.

When there is no temperature differential between the fluid at the inlet and outlet ends of heat exchanger 30 wheel 64 is positioned at such a distance from the center of disc 60 that the angular velocity of shaft 72, and, therefore, differential input gear 80 will be equal to that of shaft 50. Since gear 84 also rotates at the same speed as shaft 50, there will be no relative motion between gears 80 and 84 when the temperature differential is zero. As a consequence, differential mechanism 82 will not impart any rotation to output shaft 100.

When a temperature differential does develop between the inlet and outlet ends of heat exchanger 30 to radially displace wheel 64 to a distance greater than its zero position on disc 60, relative motion occurs between gears 80 and 84 to impart motion to shaft 100. If, for example, wheel 64 has a radius of one-fourth inch and if it is displaced by assembly 32 to a position where it is seven-sixteenth inch from the center of disc 60 when the temperature differential across the inlet and outlet ends of heat exchanger 30 is 50°, gear 80 will make 1¾ turns for every revolution made by gear 84 which rotates in the opposite direction as compared with the direction of rotation of gear 80. This results in a rotation of shaft 100 which is equal to 1¾ minus 1 divided by 2 or three-eighths turn. This three-eighths turn of output shaft 100 is multiplied by the gear train ratio of a counter gear train 120 which, as shown in FIGS. 4 and 7, drive connects shaft 100 to a BTU counter generally indicated at 122.

In effect, the integrating device integrates the number of revolutions made by shaft 50 and varies the speed ration between shafts 100 and 50 in direct proportion to the sensed temperature differential to provide a measure of the heat transferred.

Figure 2:
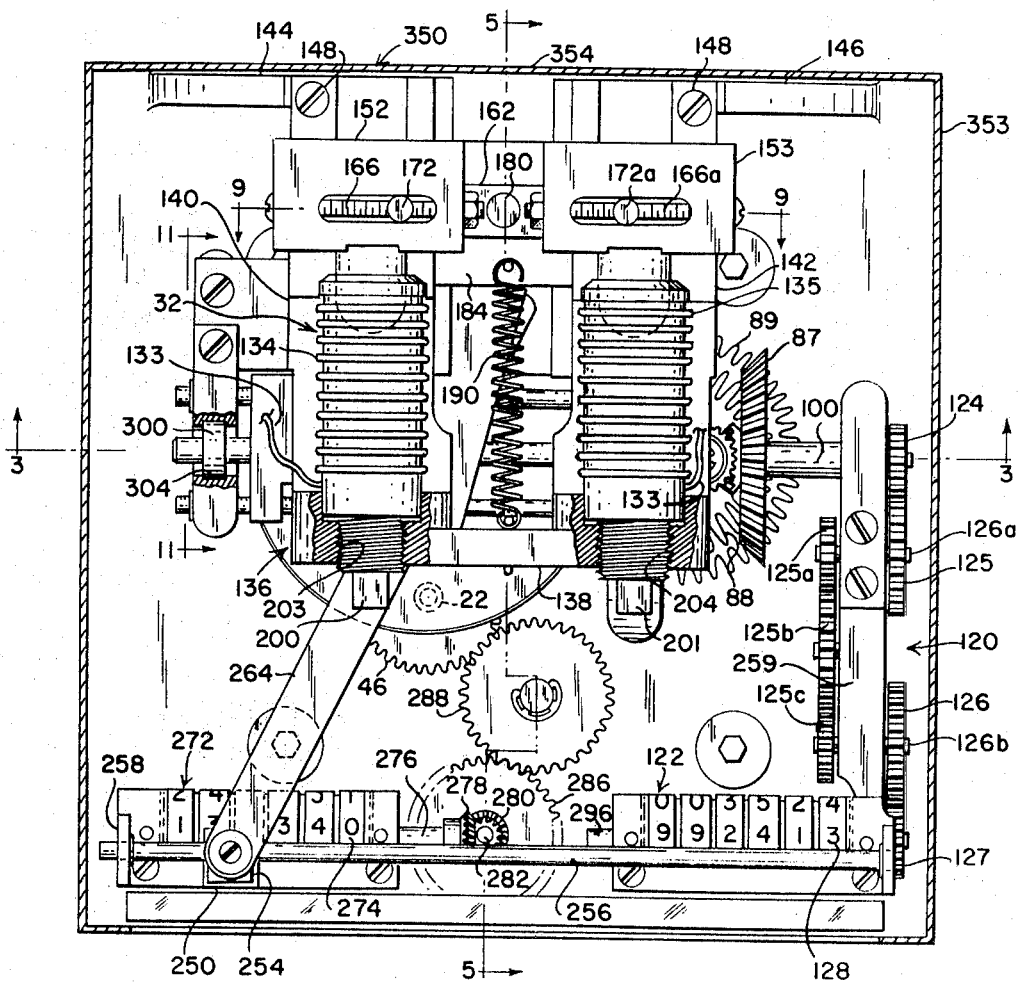
FIG. 2 is a section taken substantially along lines 2-2 of FIG. 1.
Figure 8:
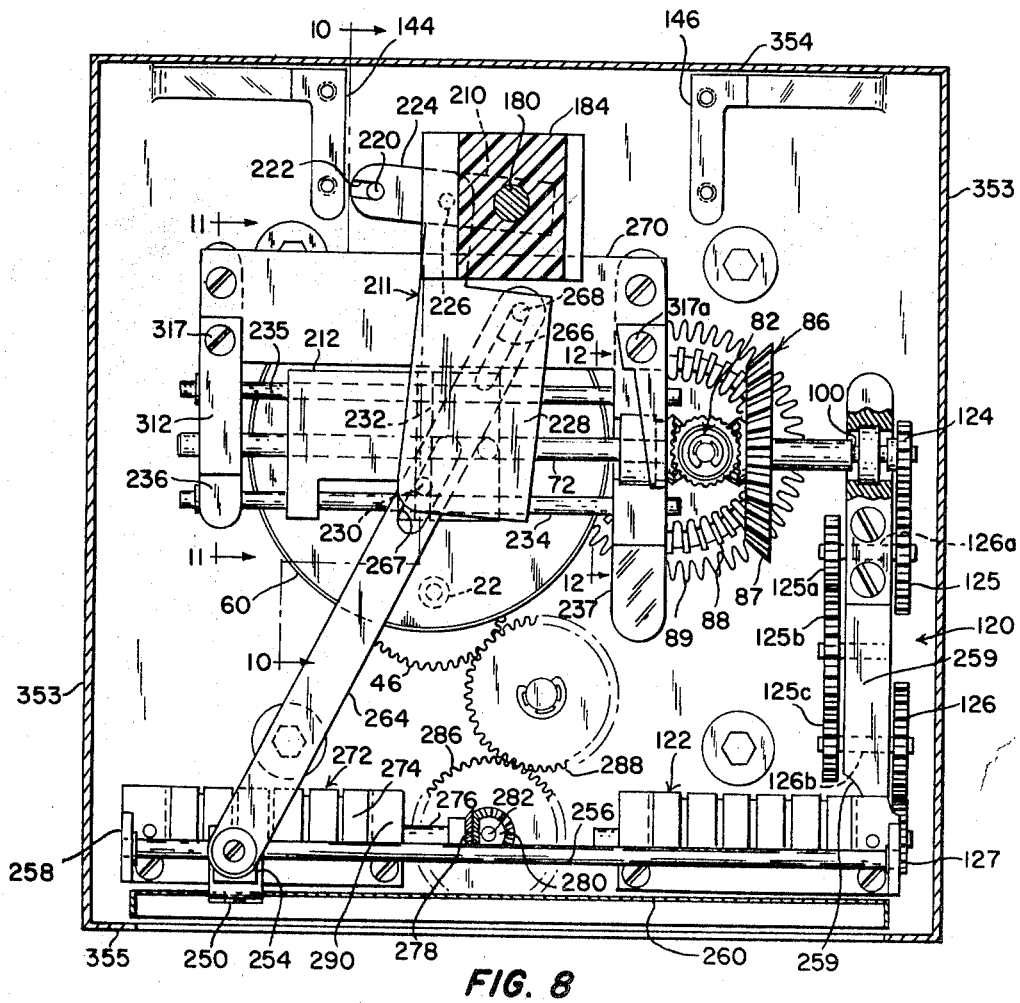
FIG. 8 is a section taken substantially along lines 8-8 of FIG. 7.

As shown in FIGS. 2, 7, and 8, gear train 120 comprises a drive gear 124, a series of idler gears 125, 125a, 125b, and 125c and 126 and an output gear 127. Gear 124 is nonrotatably fixed on shaft 100 and constantly meshes with gear 125. Gear 125 is nonrotatably mounted on a shaft 126a which also nonrotatably mounts gear 125a. Gear 125a constantly meshes with gear 125b which, in turn, constantly meshes with gear 125c. Gear 125c is fixed on a shaft 126b which nonrotatably mounts gear 126. Gear 126 constantly meshes with gear 127.

Counter 122 is of any conventional form having a multiplicity of counter wheels of which the unit counter wheel is indicated at 128 in FIG. 4. Gear 127 is drive connected to counter wheel 128 to provide for the actuation of the counter. The counter 122 continuously totalizes the heat energy in terms of BTUs which is transferred as the fluid passes between the inlet and outlet ends of heat exchanger 30.

In the embodiment shown in FIG. 1, the components of the BTU meter are arranged to provide the registration of heat transfer where heat is extracted from heat exchanger 30. Temperature-sensing elements 130 and 131 forming a part of assembly 32 are located to respectively sense the temperature at the inlet and outlet ends of the heat exchanger. Elements 130 and 131 comprise bulbs containing a suitable liquid that expands and contracts in response to temperature increases and decreases.

As shown in FIG. 2, elements 131 and 130 are respectively connected by suitable tubing indicated at 133 to a corrugated, low-temperature bellows 134 and to a corrugated high-temperature bellows 135. Bellows 134 and 135 are supported by a one-piece bracket 136 having a front wall 138 and a pair of parallel, spaced-apart, bellows cradle sections 140 and 142. Sections 140 and 142 are integral with and extend rearwardly from front wall 138. At their rearward ends, sections 140 and 142 s seat on a pair of upstanding, parallel spaced-apart posts 144 and 146 (see FIGS. 2, 8, and 9) which are integral with mounting plate 42. Bracket 136 is fixed to post 144 and 146 by screws 148 (FIG. 2) extending through sections 140 and 142 and threaded into blind, tapped bores in posts 144 and 146.

As best shown in FIG. 3, sections 140 and 142 are respectively formed with cylindrically smooth, uniformly diametered support surfaces 150 and 151. Bellows 134 and 135 are peripherally seated on surfaces 150 and 151 respectively.

As shown in FIG. 2, bellows 134 is axially confined between front wall 138 and a block 152. Similarly, bellows 135 is axially confined between front wall 138 and a block 153. Surfaces 150 and 151 extend partially circumferentially around bellows 134 and 135 respectively to cradle the bellows directly above integrating unit 34. The axes of revolution of surfaces 150 and 151 are parallel with each other and with the longitudinal axes of bellow 134 and 135.

Figure 9:
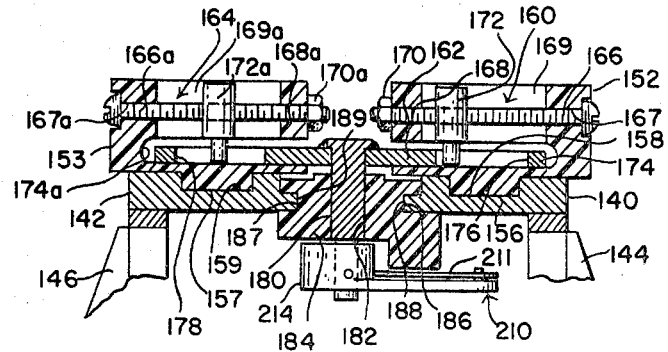
FIG. 9 is a section taken substantially along lines 9-9 of FIG. 2.

As best shown in FIG. 9, blocks 152 and 153 are respectively formed with depending, parallel, straight-sided tongues or keys 156 and 157 which are interfittingly and slidably received in straight-sided, flat-bottomed, parallel grooves 158 and 159. Grooves 158 and 159 are respectively formed in sections 140 and 142 rearwardly of surfaces 151 and 152.

Still referring to FIG. 9, an adjustment assembly 160 provides a motion-transmitting connection between block 152 and one end of a flat-sided lever 162, and an adjustment assembly 164 provides a motion-transmitting connection between block 153 and the other end of lever 162. Assembly 160 comprises a bolt 166 rotatably extending through a pair of aligned, smooth walled bores 167 and 168 and freely and transversely through an elongated slot 169 which is formed in block 152 between bores 167 and 168. A nut 170 cooperating with the enlarged head of bolt 166 confines bolt 166 against axial displacement on block 152.

Bolt 166 is threaded through a tapped, diametrical bore formed through a cylindrical post 172. Post 172 is carried by bolt 166, extends longitudinally in slot 169 and is normal to the rotational axis of bolt 166. Sufficient clearance is provided between post 172 and the straight parallel sidewalls of slot 169 to allow post 172 to be displaced axially along bolt 166 as bolt 166 is turned in one direction or the other.

The lower end of post 172 extends in a groove 174 which is formed in block 152 and which receives one end of lever 162. This end of lever 162 is formed with an aperture 176 which is elongated longitudinally along the axis of lever 162. The lower end of post 172 extends into aperture 176 with a sliding fit and at right angles to the longitudinal axis of the lever.

Assembly 164 together with the related construction of block 153 is the same as that just described for assembly 160 and block 152. Accordingly, like reference numerals suffixed by the letter "a" have been applied to assembly 164 and block 153.

As shown, the other end of lever 162 extends into groove 174a and is formed with an aperture 178 which is elongated longitudinally relative to lever 162 and which receives the lower end of post 172a with a sliding fit in the same manner described for post 172 and aperture 176. Block 153 is the mirror image of block 152 as shown.

Still referring to FIG. 9, lever 162 is fixed on a cylindrical post 180, and post 180 rotatably extends through a smooth-walled bore 182 which is formed through a block-shaped slide 184. The rotational axis of post 180, about which lever 162 is swingable, is normal to and spaced laterally between the longitudinal axes of bellows 134 and 135.

Slide 184 is between sections 140 and 142, and the opposite sidewalls of slide 184 are formed with open ended, flat-sided, flat-bottomed, parallel grooves 186 and 187. Grooves 186 and 187 slidably and interfittingly receive parallel guide rails 188 and 189 which are respectively integral with sections 140 and 142.

The entire assembly of slide 184, post 180, lever 162, blocks 152 and 153, posts 172 and 172a, and bolts 166 and 166a slide as a unit along rails 188 and 189. Rails 188 and 189 support slide 184 between sections 140 and 142 as shown. A coiled tension spring 190 extending between sections 140 and 142 (see FIG. 2) is anchored at one end to front wall 138 and at its other end to slide 184 to bias slide 184 together with lever 162, blocks 152 and 153, and the parts mounted on blocks 152 and 153 toward front wall 138 of bracket 136. As a result, the spring-applied force axially compresses bellows 134 and 135 which are respectively axially confined between block 152 and wall 138 and between block 153 and wall 138.

The assembly of bracket 136, bellows 134 and 135, blocks 152 and 153, bolts 166 and 166a, lever 162, post 180, slide 184, and spring 190 are substantially symmetrical about a vertical plane containing the longitudinal axis of post 180 and normally intersecting wall 138 and extending in parallel relation to the longitudinal axes of bellows 134 and 135.

By selectively turning bolt 166 in one direction or the other, post 172 is shifted along aperture 176 to vary the lever arm distance extending normally between the longitudinal axes of posts 172 and 180. As shown, the longitudinal axis of post 180 is parallel to the longitudinal axes posts 172 and 172a and normal to the longitudinal axes of bolts 166 and 166a.

Similarly, the lever arm distance between post 172a and post 180 is adjustable by selectively turning bolt 166a in either direction. The adjustments of this second-mentioned lever arm distance and the first-mentioned lever arm distance described in the preceding paragraph are made mutually independently of each other. By these adjustments, the angle through which post 180 is rotated per unit linear expansion or contraction of each of the bellows is therefore respectively variable. These adjustments compensate for nonlinear variations in expansion and contraction of bellows 134 and 135. Such variations are the result of manufacturing tolerances and imperfections and unless compensated for would result in inaccuracies of the readout of the amount of heat transferred relative to heat exchanger 30.

From the foregoing description it is clear that expansion and contraction of bellows 134 and 135 are confined to parallel linear paths which are normal to the longitudinal axis of post 180. Blocks 152 and 153 are also confined to reciprocable motion along parallel linear paths aligning with the travel paths of their respective bellows. The longitudinal axes of bolts 166 and 166a will always be parallel and when aligned, they will be intersected normally by the longitudinal axis of post 180.

As shown in FIG. 2, a pair of adjustment plugs 200 and 201 are respectively threaded into parallel, tapped bores 202 and 203 which are formed through wall 138. The longitudinal axes of bores 202 and 203 and thus of plugs 200 and 201 axially align with bellows 134 and 135 respectively. The inner ends of plugs 200 and 201 respectively seat against the closed ends of bellows 134 and 135 respectively. As will be described in greater detail later on, plugs 200 and 201 are used to adjust wheel 64 to its zero position when bulbs 130 and 131 are at identical temperatures.

It will be appreciated that when bulbs 130 and 131 sense different temperatures, relative expansion or contraction, as the case may be, occurs between bellows 134 and 135. As a result, there will be a relative linear travel between the bellows and a relative linear displacement between blocks 152 and 153 to impart rotation to lever 162 in one direction or the other. If, for example, the temperature sensed by bulb 131 becomes lower than the temperature sensed by bulb 130 as a result of heat being extracted from heat exchanger 30, bellows 134 will axially contract relative to bellows 135. Spring 190 will then urge slide 184 forwardly toward wall 138, applying a torque to lever 162 for turning lever 162 in a counterclockwise direction (as viewed from FIG. 2) about the axis of post 172a. Bellows 135, not having sensed a change in temperature, will prevent forward displacement of block 153 and post 172a.

As lever 162 swings about the axis of post 172a, it engages post 172 to urge block 152 forwardly, thus causing block 152 to follow the contracting bellows under the bias exerted by spring 190.

As lever 162 swings about the axis of post 172a, it will also turn in a counterclockwise direction about the axis of post 180, causing post 180 to rotate in the same direction. Aperture 178, by virtue of being elongated, will allow the right-hand end of lever 162 (as viewed from FIG. 2) to swing rearwardly without imparting rearward movement to post 172a and block 153. Instead, the side edges of aperture 178 will simply slide a short distance along post 172a.

In a similar manner, axial expansion of bellows 134 relative to bellows 135 turns lever 162 and post 180 in a clockwise direction as viewed from FIG. 2. Likewise, axial contraction of bellows 135 relative to bellows 134 causes lever 162 and post 180 to turn in a clockwise direction, whereas axial expansion of bellows 135 relative to bellows 134 imparts counterclockwise movement to lever 162 and post 180.

The rotation of post 180 is transmitted to shift wheel 64 radially along the surface of disc 60 by a motion transmitting assembly comprising a rigid arm 210, a rigid flat-sided link 211, a slide 212, and a cylindrical pin 213.

Figure 5:
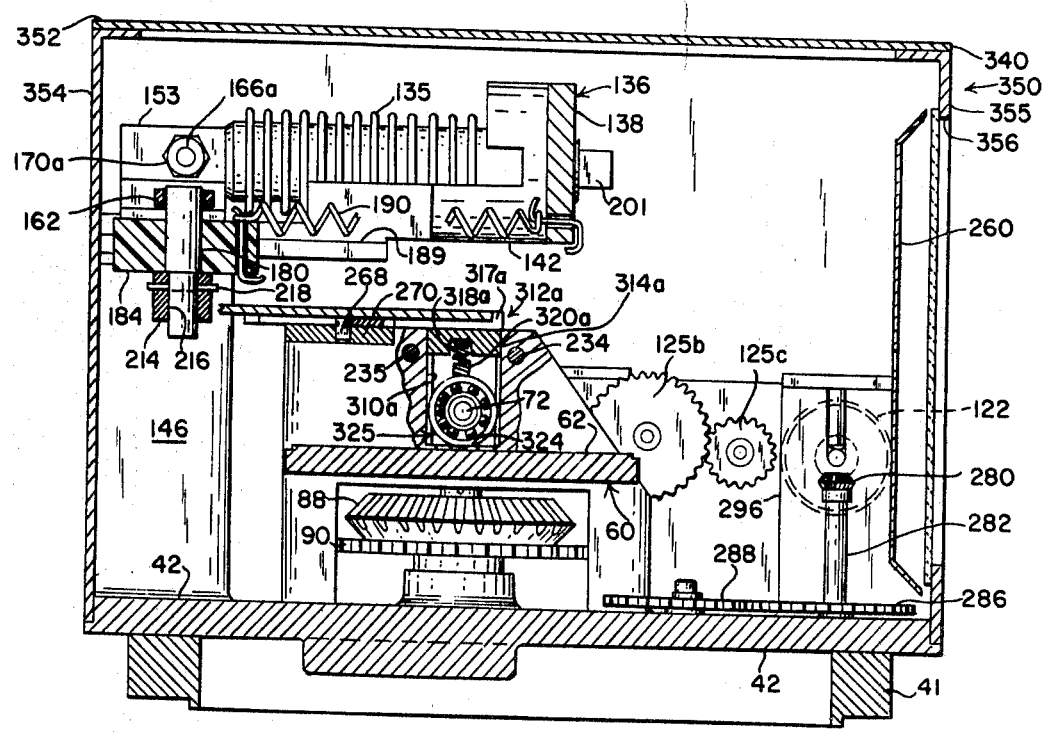
FIG. 5 is a section taken substantially along lines 5-5 of FIG. 2.

Arm 210, as best shown in FIGS. 5 and 9 is formed with a boss portion 214 having a cylindrically smooth-walled bore 216 through which the lower end of post 180 coaxially extends. Arm 210 is nonrotatably secured to post 180 by a retaining pin 218 extending perpendicularly through boss portion 214.

As best shown in FIGS. 8 and 9, arm 210 extends radially from post 180 and carries at its remote end a cylindrical pin 220 which slidably extends through a slot 222. Slot 222 is formed in a projection 224 of link 211. The longitudinal axis of pin 220 is parallel to longitudinal axis of post 180.

Link 211 is pivotable about a cylindrical pin 226 which is fixed to and depends from slide 184. Pin 226 extends through the juncture of projection 224 with a generally rectangular body section 228 of link 211. Projection 224 integrally extends laterally from section 228, and the longitudinal axes pins 226 and 220 are maintained in parallel spaced-apart relation as best shown in FIG. 8. Link 211 and arm 210 are swingable about their respective pivot axes in parallel planes, and projection 224 overlies the pin-carrying end of arm 210 as shown.

Rotation of post 180 swings arm 210 in a corresponding direction, and engagement of pin 220 with the straight, parallel side edges of slot 222 swings link 211 about pin 226 in a direction corresponding to that of arm 210.

As shown in FIGS. 3 and 8, section 228 carries at its forward end a cylindrical pin 230 which is parallel to, but spaced-apart from pins 220 and 226. Pin 230 depends from section 228 and is received with a sliding fit in an upwardly opening straight-sided, flat-bottomed groove 232. Groove 232 is formed in slide 212 and extends parallel to the path of movement of slide 184 and at right angles with respect to the longitudinal axes pins 220, 226 and 230 and post 180.

Slide 212, as shown in FIG. 8, is slidably mounted on a pair of parallel spaced-apart, cylindrical rods 234 and 235, each of which extends through aligned bores in a pair of upstanding mounting posts 236 and 237. Posts 236 and 237 are integral with plate 42, and rods 234 and 235 are each fixed at opposite ends to posts 236 and 237 respectively. The axes of rods 234 and 235 each extend parallel to the rotational axis of wheel 64 and perpendicularly with respect to groove 232 and to the longitudinal axes of pins 220, 226 and 230. Thus, slide 212 is guided by rods 234 and 235 for reciprocable displacement along a linear path which is parallel to the rotational axes of wheel 64 and shaft 100 and which is perpendicular with respect to the path of movement of slide 184, the longitudinal axes of pins 220, 226 and 230, and the longitudinal axes of bellows 134 and 135.

Pin 213, which is carried by and which depends from slide 212 is slidably received in an annular outwardly opening groove 240 as best shown in FIG. 3. Groove 240 is formed in member 66 axially between wheel 64 and portion 68. The longitudinal axis of pin 213 extends radially with respect to the rotational axes of wheel 64 and shaft 72 and parallel with respect to the longitudinal axes of pins 220, 226, and 230 and of post 180.

Thus, pivotal displacement of link 211 about the axis of pin 226 imparts linear movement to slide 212 through engagement of pin 230 with the sidewalls of groove 232, and linear displacement of slide 212 results in corresponding axial displacement of member 66 through engagement of pin 213 with the sidewalls of groove 240.

Considering the previous example where counterclockwise rotation is imparted to post 184, link 211 is also swung in a counterclockwise direction to urge slide 212 to the right as viewed from FIG. 8. As a result, member 66 is also axially displaced in the same direction by a distance proportional to the temperature difference between bulbs 130 and 131. Wheel 64 will therefore be displaced radially outwardly along disc 60 by the same distance to proportionately increase the angular velocity of wheel 64, shaft 72 and gear 80. Output shaft 100 now turns at an angular velocity proportional to the temperature differential to actuate counter 122 in the manner already described. It will be appreciated that if bellows 134 expands relative to bellows 135, lever 162 and post 180 swing in a clockwise direction as viewed from FIG. 2. As a consequence slide 212 and member 66 will be displaced axially to the left as viewed from FIG. 8 to shift wheel 64 radially inwardly with respect to disc 60. The differential between the rotational rates of gears 80 and 84 will now decrease, reducing the angular velocity of output shaft 100.

Owing to differential mechanism 82, wheel 64 does not roll near or on the center of disc 60 where the disc tends to grind and thus cause premature wear to wheel 64. Instead, wheel 64 is at an appreciable distance from the center of disc 60 when the temperature differential approaches zero.

By threading plug 200 into its bore, bellows 134 is shifted axially rearwardly against the bias of spring 190 to turn lever 162 and post 180 in a clockwise direction as viewed from FIG. 2. Conversely, threading plug 200 out of its bore allows spring 190 to urge bellows 134 forwardly, thus turning lever 162 and post 180 in a clockwise direction. Threading plug 201 into and out of its bore similarly shifts bellows 135 axially forwardly and rearwardly to turn lever 162 and post 180 respectively in counterclockwise and clockwise directions. Manipulation of plugs 200 and 201 therefor adjusts the position of wheel 64.

To calibrate unit 20, plugs 200 and 201 are adjusted while the fluid temperature at bulbs 130 and 131 are equal to shift wheel 64 to its zero position where there is no rotation of output shaft 100. This adjustment is required to compensate for variations in the lengths of bellows 134 and 135. Such variations are generally due to manufacturing tolerances and require correction to obtain accurate heat transfer measurements.

In addition to registering the heat transfer, unit 20 is provided with a temperature differential indicator 250 (see FIG. 1) coacting with a scale 252 to indicate the differential between the temperatures sensed by bulbs 130 and 131. Indicator 250, as best shown in FIG. 2, is carried by a block-shaped slide 254 which is slidably mounted for reciprocable movement on a cylindrical guide rod 256.

Rod 256, as best shown in FIG. 8 is parallel with rods 234 and 235 and is fixed at opposite ends to an upstanding mounting post 258 and a vertical wall 259 which are integral with plate 42. As shown in FIG. 1, scale 252 is provided on a dial plate 260 having an elongated, straight-sided aperture 262 through which indicator 250 extends for displacement with slide 254.

A flat-sided, motion-transmitting link 264 (see FIGS. 2 and 8) is pivotally connected at its forward end to slide 254. The opposite end of link 264 extends between slide 212 and section 228 of link 211 and is formed, as best shown in FIG. 8, with a pair of elongated, aligned apertures 266 and 267.

Figure 10:
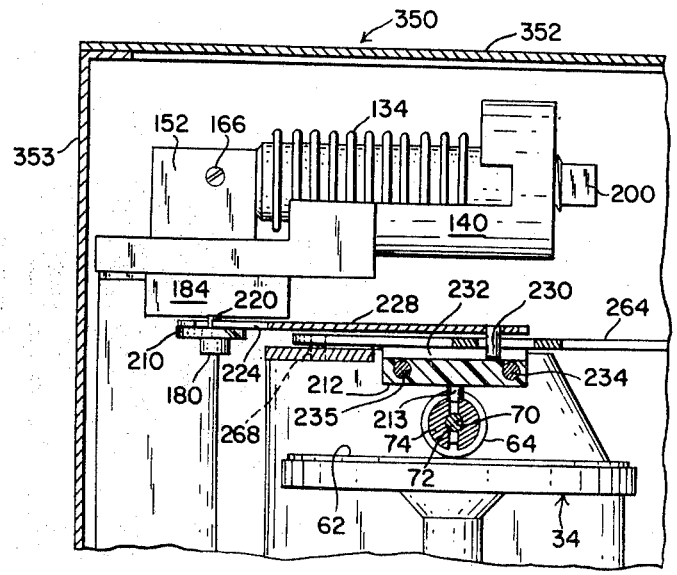
FIG. 10 is a section taken substantially along lines 10-10 of FIG. 8.

A cylindrical pivot post 268 (see FIGS. 8 and 10) which is fixed to a support plate 270, slidably extends through aperture 266 which is nearest to the rearward end of link 264 as viewed from FIG. 8. Plate 270 is fixed to and bridges posts 236 and 237. Pin 230 slidably extends through aperture 267 so that when link 211 is swung about pin 226, pin 230, by engaging the side edges of aperture 267, swings link 264 about the axis of post 268. The longitudinal axis of post 268 is parallel with the longitudinal axes of pins 230, 226, and 220.

Apertures 266 and 267 are longitudinally elongated to allow linear displacement of link 264 along its longitudinal axis as it is swung about the axis of post 268. This linear displacement is necessary because the forward end of link 264, by virtue of being pivotally secured to slide 254, is confined to reciprocable movement along a linear path which extends parallel to the path of movement of slide 212.

Unit 20 is conveniently provided with a further counter 272 (see FIGS. 1 and 2) for totalizing the volumetric flow through meter 26. The units wheel of counter 272 is indicated at 274 and has a units wheel drive shaft 276. A gear 278 mounted on shaft 276 constantly meshes with a gear 280 which is fixed at the upper end of a drive shaft 282 as best shown in FIG. 5.

Shaft 282 is rotatable about a vertical axis normally intersecting the horizontal rotational axis of shaft 276. Fixed on the lower end of shaft 282 is another gear 286 which constantly meshes with an idler gear 288. Gear 288 constantly meshes with gear 46 and is mounted for rotation about an axis that is parallel to the rotational axes of shafts 22 and 282.

Counter 272 is suitably supported between post 258 and another mounting post 290 (see FIGS. 2 and 8) which is also integral with plate 42. A window 292 (FIG. 1) formed in dial plate 260 exposes the counter wheel numbers. A similar window 294 is provided for counter 122 which is suitably mounted between wall 259 and another upstanding post 296 (see FIGS. 2 and 8) which is integral with plate 42.

Figure 11:
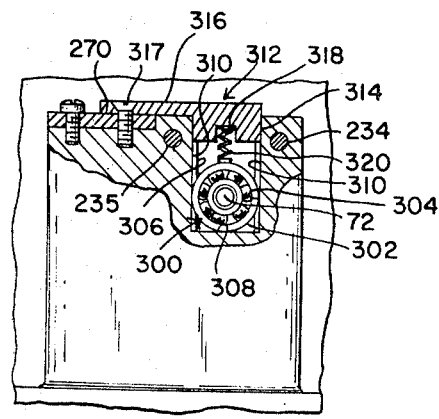
FIG. 11 is a section taken substantially along lines 11-11 of FIG. 2.

As best shown in FIG. 11, the end of shaft 72 remote from differential mechanism 82 is journaled for rotation in a conventional antifriction ball bearing assembly 300 having an outer race 302 seated in an upwardly opening, straight-sided, flat-bottomed notch 304 which is formed in post 236. The parallel sidewalls of notch 304 are indicated at 306, and the bottom wall of the notch, which extends perpendicularly between sidewalls 306, is indicated at 308.

Still referring to FIG. 11, flat-bottomed, parallel, shallow grooves 310 are formed in sidewalls 306 and receive diametrically opposite portions of race 302. Race 302 is peripherally seated against the straight, flat bottom walls of grooves 310 to confine bearing assembly 300 against lateral displacement in a generally horizontal direction. The upper ends of grooves 310 are open so that bearing assembly 300 may be inserted into notch 304 by sliding it down grooves 310 to a position where race 302 peripherally seats on bottom wall 308. The end faces of race 302 seat against the straight sidewall surfaces of grooves 310 (see FIG. 2) to confine bearing assembly 300 against axial displacement.

As shown in FIG. 11, a bearing plate 312, which is fixed by a screw 317 to post 236, has a flat-sided section 314 which is slidably received in the upper end of notch 304. Section 314 is formed with a downwardly opening, vertical blind bore 318 along an axis substantially normally intersecting the rotation axis of shaft 72. A coiled spring 320, having one end coaxially seated in bore 318, is compressed between the bottom wall of bore 318 and the outer periphery of race 302 to resiliently bias race 302 into seating engagement with the bottom wall of notch 304.

With the foregoing, it is clear that bearing assembly 300 is confined against lateral displacement in a horizontal direction and against axial displacement by engagement with the previously mentioned rigid surfaces defined by notch 304. Bearing assembly 300, however, is vertically displaceable along grooves 310 against the bias exerted by spring 320.

As shown in FIGS. 3 and 5, the end shaft 72 remote from bearing assembly 300 extends through a notch 324 which is formed in post 237. Gear 80 and wheel 64 are on opposite sides of post 237. A conventional antifriction ball bearing assembly 325 journaling this end of shaft 72 is mounted in notch 324 in the same manner just described for bearing assembly 300. The configuration of notch 324 and the spring and retainer plate structure for bearing assembly 325 is the same as notch 304, spring 320, and plate 213. Accordingly, like reference numerals suffixed by the letter "a" have been applied to designate the element associated with bearing assembly 325.

From the foregoing description, it is clear that shaft 72 and wheel 64 are vertically displaceable in a plane extending at right angles to disc surface 62 under the influence of springs 320 and 320a which bias wheel 64 into engagement with surface 62. This construction thus allows wheel 64 to smoothly ride over irregularities in disc surface 62 to avoid binding or an objectionable increase in friction between wheel 64 and disc 60.

As shown, unit 20 is provided with a box-shaped cover 350 having a top wall 352 (FIGS. 3, 5, and 7), depending sidewalls 353 (FIG. 3), a depending rear wall 354 (FIG. 5) and a depending front wall 355 (FIGS. 1, 5 and 7). The lower edges of walls 353—355 seat on a ledge which is formed on plate 42, and cover 350 is detachably secured to plate 42 by any suitable means such as screws (not shown). A window 356 (FIG. 1) is formed in front wall 355 for dial plate 260.

When cover 350 is removed, bellows 134 and 135 are readily accessible for repairs or replacement by virtue of being raised above the other operative components of unit 20 as best shown in FIG. 3. Plugs 200 and 201 and bolts 166 and 166a are also readily accessible for adjustment by virtue of being on the same raised level with bellows 134 and 135.

As shown in FIGS. 2 and 7, wall 259 extends closely along one side edge of plate 42 in parallel relation thereto, thus making access to gears 124, 125, 125a, 125b, 125c, 126 and 127 exceptionally convenient upon removal of cover 350. Thus the gear ratio between shaft 100 and counter 122 may be changed by changing one or more of the foregoing gears without interfering with other operative parts in unit 20. In this fashion the temperature operating range of the meter can quickly and easily be altered.

From the foregoing description, it is clear that integrating device 34 comprises a variable drive ratio transmission which is driven by fluid flowing through meter 26. The drive ratio of the transmission is varied by axial displacement of wheel 64 along shaft 72 under the control of bellows 134 and 135.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to be secured by Letters Patent is:

1. In an apparatus for measuring the amount of heat transfer relative to fluid flowing through a heat exchanger, a rotatable drive element adapted to be driven in accordance with the fluid flow rate through said heat exchanger, a variable drive ratio transmission driven by said drive element and means for varying the drive ratio of said transmission in accordance with the difference in the temperature of the fluid entering and leaving said heat exchanger to provide said transmission with an output representative of the heat transferred relative to the fluid, said drive-ratio-varying means comprising a motion-transmitting member operatively connected to said transmission and being rotatable about a predetermined axis for varying said drive ratio, a pair of axially expansible and contractable bellows elements interconnected by said member and being thermally responsive respectively to the temperature of the fluid entering said heat exchanger and the temperature of the fluid leaving the exchanger for angularly positioning said member about said axis in accordance with the difference between said temperatures, and means for selectively adjusting the lever arm distance between said axis and the connection of each bellows to said member to vary the magnitude of rotational motion imparted to said member by expansion and contraction of each bellows, said adjusting means being selectively manipulatable to compensate for nonlinear variations in expansion and contraction of said bellows elements by adjustment of the lever arm distance between said axis and the connection of each bellows element to said member.

2. The apparatus defined in claim 1 wherein said member is supported for rectilinear movement along a path extending parallel to the longitudinal expansion and contraction axes of said bellows elements and wherein resilient means biases said member in a direction for contracting both of said bellows elements.

3. The apparatus defined in claim 1 comprising means supporting both of said bellows elements in parallel side-by-side relation, both of said bellows elements being positioned to expand and contract in the same directions.

4. In an apparatus for measuring the amount of heat transfer relative to fluid flowing through a heat exchanger, a rotatable drive element adapted to be driven in accordance with the fluid flow rate through said heat exchanger, means comprising a variable ratio transmission driven by said element, means operatively connected to the output of said transmission to provide an indication of heat transferred relative to said heat exchanger, a pair of axially expansible and contractable bellows elements, and motion-transmitting means interconnecting said bellows elements and including a member angularly displaceable about a predetermined pivot axis, said bellows elements being thermally responsive respectively to the temperature of the fluid entering said heat exchanger and to the temperature of the fluid leaving said heat exchanger for angularly positioning said member about said axis in accordance with the difference between the temperatures of the fluid entering and leaving said heat exchanger, the improvement comprising means providing for the bodial displacement of said member together with its pivot axis relative to each of said bellows elements upon either expansion or contraction of said bellows elements to enable either of said bellows elements to expand or contract without causing expansion or contraction of the other bellow element, and means operatively connecting said member to said transmission for varying the drive ratio of said transmission in accordance with the angular displacement of said member and independently of the bodial displacement of said member.

5. The apparatus defined in claim 4 comprising calibrating means for adjusting the drive ratio to a value representative of a zero temperature difference, said calibrating means being operable to position said member by axially displacing said bellows elements relative to each other.

6. The apparatus defined in claim 4 comprising means supporting both of said bellows elements vertically above said transmission and in parallel, side-by-side relation for expansion and contraction in the same directions.

7. The apparatus defined in claim 4 wherein the displacement of said member provided by said bodial displacement means is rectilinear.

8. The apparatus defined in claim 4 comprising means supporting said bellows elements for expansion and contraction along parallel axes, the displacement for expansion and contraction along parallel axes, the displacement of said member provided by said bodial displacement means being rectilinear along a path that is parallel to the expansion and contraction axes of said bellows elements.

9. The apparatus defined in claim 8 wherein said means providing bodial displacement of said member comprises guide means, and a slide slidably supported on said guide means for rectilinear motion along a path extending parallel to the expansion and contraction axes of said bellows elements, said member being carried by said slide for rectilinear motion therewith and being pivotably supported on said slide for angular displacement about its predetermined axis by the forces applied by said bellows elements.

10. The apparatus defined in claim 9 wherein said motion-transmitting means includes first and second adjustment means respectively and separately connecting said bellows elements to said member on opposite sides of said predetermined axis, each of said adjustment means being selectively adjustable to vary the lever arm distance between its connection to said member and the predetermined axis of said member.

11. The apparatus defined in claim 10 wherein said bellows elements are supported by said bellows-element-supporting means in side-by-side relation for expansion and contraction in the same directions, and wherein said guide means forms a part of said bellows-element-supporting means.

12. In an apparatus for measuring the amount of heat transfer relative to fluid flowing through a heat exchanger, a rotatable drive element adapted to be driven in accordance with the fluid flow rate through said heat exchanger, a variable drive ratio transmission driven by said drive element, and means for varying the drive ratio of said transmission in accordance with the difference in the temperature of the fluid entering and leaving said heat exchanger to provide said transmission with an output representative of the heat transferred relative to said fluid, said drive-ratio-varying means comprising a pair of axially expansible and contractable bellows elements thermally responsive respectively to the temperature of the fluid entering said heat exchanger and to the temperature of the fluid leaving the exchanger, means transmitting the relative expansion and contraction of said bellows to said transmission for controlling said drive ratio, and means supporting said bellows elements in parallel, side-by-side relation for expansion and contraction in the same directions, said support means being formed with parallel sections having arcuate surfaces peripherally cradling said bellows elements vertically above said transmission, said support means further being formed with an upstanding wall portion joining corresponding ends of said sections and axially confining the ends of said bellows elements adjacent thereto, and said means transmitting the relative expansion and contraction of said bellows elements comprising a pair of members abutting the ends of said bellows elements remote from said wall portion and being slidably mounted on said sections, and resilient means biasing said members in a direction to contract said bellows elements, thereby axially confining each of said bellows elements between said wall portion and its abutting member.

13. In an apparatus for measuring the amount of heat transfer relative to fluid flowing through a heat exchanger, a rotatable drive element adapted to be driven in accordance with the fluid flow rate through said heat exchanger a variable drive ratio transmission driven by said drive element, and means for varying the drive ratio of said transmission in accordance with the difference in the temperature of the fluid entering and leaving said heat exchanger to provide said transmission with an output representative of the heat transferred relative to said fluid, said drive-ratio-varying means comprising a pair of axially expansible and contractable bellows elements thermally responsive respectively to the temperature of the fluid entering said heat exchanger and to the temperature of the fluid leaving the heat exchanger, motion-transmitting means operatively connected between the assembly of said bellows elements and said transmission to control the drive ratio in accordance with the difference between the temperature to which said bellows elements respond, and means forming a part of said motion-transmitting means for selectively adjusting the magnitude of motion transmitted by each of said bellows elements by expansion and contraction thereof to compensate for heat transfer measurement inaccuracies attributable to said bellows elements.

14. The apparatus defined in claim 13 comprising resilient means for applying a biasing force through said adjusting means to contract said bellows elements.

UNITED STATES PATENT OFFICE
CERTIFICATE OF CORRECTION

Patent No. 3,593,578　　　　　　　　Dated July 20, 1971

Inventor(s) Thomas C. Farrell and Harry W. Fisher

It is certified that error appears in the above-identified patent and that said Letters Patent are hereby corrected as shown below:

Column 5, line 2, change "ration" to -- ratio --.

Column 5, line 58, change "bellow" to -- bellows --.

Column 10, line 33, after "end" insert -- of --.

Claim 8, Column 12, lines 19 and 20, delete "the displacement for expansion and contraction along parallel axes"

Claim 13, Column 14, line 6, change "temperature" to -- temperatures --.

Signed and sealed this 14th day of March 1972.

(SEAL)
Attest:

EDWARD M. FLETCHER, JR.　　　　　　ROBERT GOTTSCHALK
Attesting Officer　　　　　　　　　Commissioner of Patents